(No Model.)
G. DIPPOLD.
SAFETY ATTACHMENT FOR VEHICLE THILLS.
No. 491,838. Patented Feb. 14, 1893.
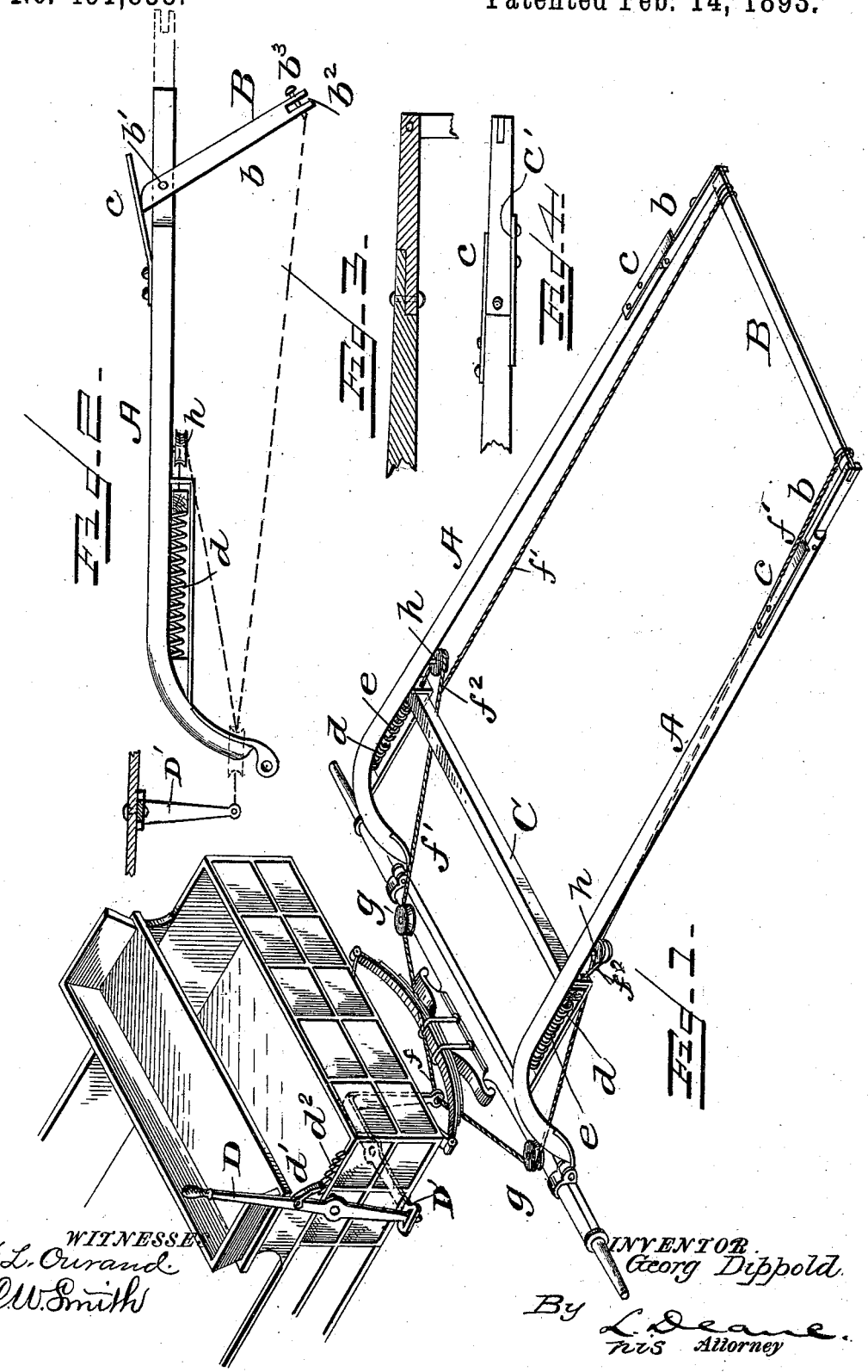

UNITED STATES PATENT OFFICE.

GEORG DIPPOLD, OF BROOKLYN, NEW YORK.

SAFETY ATTACHMENT FOR VEHICLE-THILLS.

SPECIFICATION forming part of Letters Patent No. 491,838, dated February 14, 1893.

Application filed July 20, 1892. Serial No. 440,614. (No model.)

*To all whom it may concern:*

Be it known that I, GEORG DIPPOLD, a citizen of the United States, residing at the city of Brooklyn, in the county of Kings and State of New York, have invented certain new and useful Improvements in Safety Attachments for Thills; and I do hereby declare the following to be a full, clear, and exact description of the invention, such as will enable others skilled in the art to which it appertains to make and use the same.

My invention relates to an improved device for vehicle shafts as a preventive against the horse or team running away and it consists in the combination with the shaft of means for hampering the movement of the horse or animal and which is adapted to be applied by the driver at the seat, all substantially as hereinafter more fully disclosed, and pointed out in the claims.

In the accompanying drawings: Figure 1 is a broken perspective view of a vehicle or wagon including the shafts, embodying my invention; Figs. 2 and 3 are detailed views thereof, and Fig. 4 is a detailed side view of a modification of the same.

In the embodiment of my invention, I provide the usual shafts A, at the outer ends, with a forward cross-bar or frame B having its side pieces or arms $b$ pivoted near their inner upper-edge beveled ends, as at $b'$, to said shafts, the meeting portions of which may be halved together as shown. The frame or bar B is held in its normal position in alignment with the shafts by flat or plate springs $c$, secured at their inner ends to the shafts and resting upon the beveled upper edges of the arms or side-pieces $b$ of said frame or bar. The cross-bar of the frame B is readily removable from the side-pieces or arms $b$, being held in mortises or sockets $b^2$ in the latter by headed pins $b^3$.

Arranged in brackets or keepers $d$ secured to the underside of the shafts A, near the rear ends thereof is a cross-bar C secured near its ends to the forward ends of springs $e$, the rear ends of the latter being suitably secured to the shafts or appendages thereof as shown.

D is a hand lever convenient to the driver and suitably fulcrumed upon the side of the vehicle-body, and having a pawl and ratchet connection $d'$ $d^2$ with said body, and D' is a second lever pivoted to the underside of the vehicle body floor, and adapted to receive at one end the lower end of said hand-lever. The opposite end of the lever D' has extending forward therefrom a line or cable $f$ branching off into two other lines $f'$ $f'$ passing over pulleys on the axle, and connected to the cross bar or frame B and themselves having branch lines $f^2$ passing over pulleys $h$, depending from the shaft, said branch-lines $f^2$ then passing through apertures in the keepers $d$ and finally secured to the cross-bar C. From this arrangement, it will be seen that in case of an emergency by moving the hand-lever D backward the lines or cables $f$ $f'$ $f^2$ will be drawn upon so as to cause the downward deflection of the cross-bar B and the moving forward of the bar C bringing said bars against the front and rear legs of the horse, respectively, which would have the effect to hamper the movement of the horse and thus act as a preventive against his running away. The disengagement of the pawl $d'$ of the lever D from its ratchet $d^2$ will permit the springs $c$, $c$, to automatically restore the frame or bar B and bar C to their normal positions, taking them out of contact with the legs of the horse and permitting him to travel unhampered having been brought under control by the previous action of the parts.

As shown in Fig. 4 a spring $c'$ may be also applied to the underside of each shaft to act upon each side-piece or arm of the frame B to assist the automatic return of the frame to its normal position.

Having thus described my invention, what I claim as new and desire to secure by Letters Patent, is:—

1. In a vehicle, the combination with the shafts or means for hitching the horse to the vehicle, of the front and rear cross bars connected thereto to be moved toward the front and rear legs of the horse, respectively, and means for operating said bars, substantially as set forth.

2. In a vehicle, the combination, with the shafts of the front cross-bar or frame having spring-pressed arms or side pieces pivoted to the shafts, the rear spring-seated cross-bar, the lines or cables connected to said crossbars and passed over pulleys, and a hand-lever connected to said lines, substantially as set forth.

In testimony whereof I affix my signature in presence of two witnesses.

GEORG DIPPOLD.

Witnesses:
FRED C. HELLMUTH,
CHAS. F. WEITZEL.